(12) United States Patent
Kasahara et al.

(10) Patent No.: US 6,767,855 B2
(45) Date of Patent: Jul. 27, 2004

(54) CATALYST FOR PURIFYING EXHAUST GAS

(75) Inventors: Koichi Kasahara, Ogasa-gun (JP); Yasunori Sato, Ogasa-gun (JP); Kenichi Taki, Ogasa-gun (JP)

(73) Assignee: Cataler Corporation, Ogasa-gun (JP)

( * ) Notice: Subject to any disclaimer, the term of this patent is extended or adjusted under 35 U.S.C. 154(b) by 60 days.

(21) Appl. No.: 10/059,218

(22) Filed: Jan. 31, 2002

(65) Prior Publication Data

US 2003/0153453 A1 Aug. 14, 2003

(51) Int. Cl.⁷ .................................................. B01J 29/06
(52) U.S. Cl. .......................... 502/66; 502/63; 502/64; 502/65; 502/67; 502/69; 502/73; 502/74
(58) Field of Search .............................. 502/63, 64, 65, 502/66, 67, 69, 73, 74

(56) References Cited

U.S. PATENT DOCUMENTS

| | | | |
|---|---|---|---|
| 5,077,253 A | * 12/1991 | Chu et al. ...................... 502/61 |
| 5,078,979 A | 1/1992 | Dunne |
| 5,292,696 A | * 3/1994 | Ito et al. ....................... 502/66 |
| 5,407,880 A | 4/1995 | Ikeda et al. |
| 5,439,865 A | 8/1995 | Abe et al. |
| 5,744,103 A | * 4/1998 | Yamada et al. ............. 422/171 |
| 5,928,981 A | * 7/1999 | Leyrer et al. ................. 502/64 |
| 6,047,544 A | * 4/2000 | Yamamoto et al. ........... 60/285 |
| 6,074,973 A | * 6/2000 | Lampert et al. ............... 502/60 |
| 6,080,375 A | * 6/2000 | Mussmann et al. ...... 423/213.5 |
| 6,093,378 A | * 7/2000 | Deeba et al. ............. 423/213.5 |

FOREIGN PATENT DOCUMENTS

| | | |
|---|---|---|
| EP | 0 460 542 A2 | 12/1991 |
| EP | 0 460 542 A | 12/1991 |
| EP | 0 734 757 A1 | 10/1996 |
| EP | 0 904 827 A1 | 3/1999 |
| JP | A 5-57148 | 3/1993 |
| JP | A 6-154538 | 6/1994 |
| JP | A 11-104462 | 4/1999 |
| JP | A 11-210451 | 8/1999 |
| WO | WO 00/59630 A | 10/2000 |
| WO | WO 00/59630 | 10/2000 |

* cited by examiner

*Primary Examiner*—Kiley Stoner
*Assistant Examiner*—Christina Ildebrando
(74) *Attorney, Agent, or Firm*—Oliff & Berridge, PLC

(57) ABSTRACT

A catalyst for purifying exhaust gases, which enables the HC-purification performance to be further improved by suitably arranging an HC-adsorbent. The catalyst includes a coating layer which is composed of alumina and zeolite, and carries a noble metal. The weight ratio of alumina and zeolite in the coating layer ranges from 5:1 to 1:1. Zeolite adsorbs HC when exhaust gases are in a low temperature region, and HC desorbed from zeolite is oxidized and purified with the noble metal.

7 Claims, 2 Drawing Sheets

CATALYST FOR PURIFYING EXHAUST GAS

BACKGROUND OF THE INVENTION

1. Field of the Invention

The present invention relates to catalysts capable of effectively purifying hydrocarbon (HC) included in exhaust gases of which temperatures range from a low temperature region to a high temperature region.

2. Description of Related Art

Conventionally, oxidation catalysts which carry noble metals such as Pt (platinum) in porous carriers composed of alumina or the like have been used as catalysts for purifying exhaust gases of motor vehicles. With these oxidation catalysts, HC and CO (carbon monoxide) in exhaust gases are oxidized and purified.

In addition, by adjusting the air-fuel ratio to a stoichiometric air-fuel ratio, catalysts which carry noble metals such as Pt in porous carriers composed of alumina or the like operate to oxidize CO and HC in exhaust gases and reduce $NO_x$ (nitrogen oxides) therein at the same time, and accordingly have been called three-way catalysts. As such three-way catalysts, there have been widely used catalysts, each having a porous carrier layer composed of γ-alumina, which is formed on a heat-resistant honeycomb substrate composed of cordierite or the like, and by which noble metals such as Pt, Rh (rhodium) or the like are carried, for example.

These oxidation catalysts and three-way catalysts, however, have problems that the catalyst reaction thereof does not occur until the noble metals carried thereby exceed their activity temperatures. Accordingly, where engines are started or are in cold states, the temperatures of exhaust gases are low, and the noble metals do not reach their activity temperatures, whereby HC and $NO_x$ are difficult to be purified.

Where engines are in cold states, an air-fuel mixture of which the fuel concentration is higher than that where engines are normally operated, is supplied, and accordingly, the amount of HC included in exhaust gases is large. In addition, noble metals are not activated at temperatures lower than about 300° C. Therefore, at low temperatures such as the temperatures when engines are started, it is impossible to purify HC included in exhaust gases sufficiently. Accordingly, it has been particularly desired to purify HC effectively where the engines are in cold states or are started.

Zeolite which has been also referred to as molecular sieves has micro pores of which the diameter is less than 2 nm, similarly to dimensions of molecules, and accordingly has been used as adsorbents, and catalysts in many reactions. Recently, the application of zeolite having the above-described properties to catalysts for purifying exhaust gases of motor vehicles has been investigated. Zeolite itself is, however, low in carrying properties of noble metals, and if carrying, the amount of carried noble metals is too small to exhibit sufficient oxidizing ability.

For this reason, recently, zeolite has been used as adsorbent for HC. As shown in publications of unexamined Japanese Patent applications Nos. Hei 5-057148 and Hei 6-154538, there have been developed exhaust gas purifying devices wherein adsorbent such as zeolite is disposed upstream of an oxidation catalyst or three-way catalyst in an exhaust gas flowing direction. With these exhaust gas purifying devices, when engines are at low temperatures upon starting the engines, for example, HC in exhaust gases is first adsorbed on the adsorbent. When the temperature of exhaust gas is elevated, the adsorbed HC is desorbed, and the desorbed HC is oxidized and purified with the oxidation catalyst or three-way catalyst which is arranged downstream of the adsorbent and of which the temperature is elevated to its activity temperature or more.

And in publications of unexamined Japanese Patent applications Nos. Hei 11-210451, Hei 11-104462, for example, there are proposed integral honeycomb monolithic catalysts for purifying exhaust gases, each having a coating layer composed of powder of adsorbent for HC as a lower layer and another coating layer composed of powder of oxidation catalyst or three-way catalyst as an upper layer.

With these catalysts for purifying exhaust gases, at a low temperature, HC in exhaust gases passes the upper layer which does not reach its activity temperature, and is adsorbed on the adsorbent for HC in the lower layer. As the temperature of exhaust gases is elevated, HC which has been adsorbed is desorbed, and is oxidized and purified with the oxidation catalyst or three-way catalyst in the upper layer, of which the temperature increases to its activity temperature or more.

With these exhaust gas purifying devices or catalysts, when engines are in cold states or are started, HC included in exhaust gases is adsorbed on the adsorbent for HC to restrain the emission thereof. And, when the temperatures are elevated, HC desorbed from the adsorbent for HC and included in exhaust gases is oxidized and purified with the oxidation catalyst or three-way catalyst. Accordingly, the emission of HC can be restrained from the lower temperature region to the higher temperature region. The amount of HC which is emitted unburnt can be reduced.

However, in the devices for purifying exhaust gases wherein the adsorbent such as zeolite is arranged upstream of the oxidation catalyst or three-way catalyst, heat of exhaust gases is absorbed by the upstream adsorbent to block the elevation of the temperature of the downstream oxidation catalyst or three-way catalyst so that it takes a long time to elevate the temperatures of noble metals carried by the catalyst up to the activity temperatures thereof, and the HC-purification rate does not increase until the temperatures of the noble metals are elevated up to the activity temperatures thereof.

For solving the above-described problem, it is more profitable to use catalysts, each having a layer of an adsorbent for HC as its lower layer and an oxidation catalyst layer or three-way catalyst layer as its upper layer. However, considering the recent tightened emission regulation, much improvement of the purification performance is desired.

SUMMARY OF THE INVENTION

The present invention has been made considering these circumstances, and has an object of much improving the HC-purification performance by providing zeolite as an adsorbent for HC in a most suitable arrangement.

The catalyst for purifying exhaust gases in accordance with the present invention includes a substrate having heat resistance, a coating layer composed of a carrier containing alumina as a main ingredient, and zeolite, and formed on a surface of the substrate, and noble metals which are carried by the coating layer. The composition ratio of alumina and zeolite in the coating layer ranges from 5:1 to 1:1 by weight.

It is preferable that a layer of an adsorbent for HC (hereinafter referred to as HC-adsorbent) is further formed between the substrate and the coating layer.

Another catalyst for purifying exhaust gases in accordance with the present invention includes a substrate having heat resistance, an HC-adsorbent layer formed on a surface of the substrate a lower catalyst layer composed of a porous carrier which carries Pd, and formed on a surface of the HC-adsorbent layer, and an upper catalyst layer composed of a porous carrier which carries Pt and Rh, and formed on a surface of the lower catalyst layer.

It is preferable that at least one of the lower catalyst layer and upper catalyst layer in the above-described catalyst for purifying exhaust gases contains at least oxide containing Ce.

Other objects, features, and characteristics of the present invention will become apparent upon consideration of the following description and the appended claims with reference to the accompanying drawings, all of which from a part of this specification.

DETAILED DESCRIPTION OF THE PRESENTLY PREFERRED EXEMPLARY EMBODIMENTS

Figure 1:
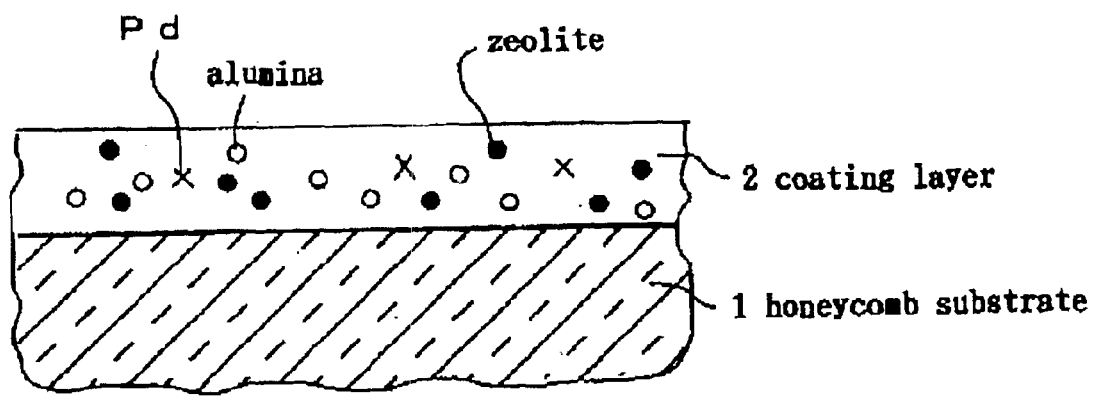
FIG. 1 is an enlarged sectional view which schematically illustrates the arrangement of a main part of a first embodiment of a catalyst for purifying exhaust gases in accordance with the present invention.

In accordance with a first aspect of the catalyst of the present invention, noble metals are carried by a coating layer which is composed of a carrier containing alumina as a main ingredient, and zeolite. Accordingly, when exhaust gases in a low temperature region flow into the catalyst of the first aspect of the present invention upon starting engines, for example, the temperatures of the noble metals carried by the coating layer are not raised to their activity temperatures, and consequently, HC in exhaust gases is adsorbed on zeolite without oxidized, whereby the emission of HC is restrained.

When the temperatures of exhaust gases are elevated, and the temperatures of the noble metals carried by the catalyst carrier become higher than their activity temperatures, HC in exhaust gases is oxidized and purified by the noble metals. In addition, HC which has been adsorbed on zeolite is desorbed therefrom, and is oxidized and purified with the noble metals carried in the coating layer while exhaust gases pass the same. Consequently, emission of HC is also restrained when exhaust gases are in a high temperature region.

in accordance with the first aspect of the catalyst of the present invention, noble metals are excellent in oxidation activities for Co and reduction activities for $NO_x$. Accordingly, CO in exhaust gases is oxidized and purified with noble metals, and $NO_x$ is reduced and purified by adjusting the air-fuel ratio to a most suitable air-fuel ratio.

And by further providing an HC-adsorbent layer between the substrate and the coating layer, the HC-adsorption ability is further improved, whereby emission of HC can be further restrained when exhaust gases are in a low temperature region. In addition, when exhaust gases are in a high temperature region, and HC is desorbed from the HC-adsorbent layer, the desorbed HC is oxidized and purified with the noble metals which are carried by the coating layer while passing the same. Accordingly, there does not occur such a problem that the HC-purification rate drops when exhaust gases are in a high temperature region.

In the first aspect of the present invention, substrates of the catalysts can take a pellet-like configuration, a foam-like configuration or a honeycomb-like configuration. Honeycomb bodies which are obtained by heat-resistant ceramics such as cordierite, winding metallic foil, or the like can be used for the substrates.

In the first aspect of the catalyst for purifying exhaust gases, the coating layer is composed of alumina as a main ingredient, and further contains zeolite. Where zeolite is contained, even if the amount thereof is small, the HC-adsorption performance of the coating layer is improved thereby. In this case, the composition ratio of alumina and zeolite in the coating layer ranges from 5:1 to 1:1 by weight. By adjusting the composition ratio of alumina and zeolite in the coating layer within this range, both the HC-adsorption performance and warming-up performance can be effected.

Where the amount of zeolite is less than the above range, the amount of adsorbed HC is small, and consequently, it becomes difficult to effectively restrain the HC emission when exhaust gases are in a low temperature region. On the other hand, where the amount of zeolite exceeds the above range, spreadability of ignition occured by oxidation of HC becomes difficult, and the warming-up characteristic of the catalyst lowers to degrade the purification performance. In addition, since the amount of alumina relatively decreases, the purification performance is also degraded thereby.

Examples of zeolite include ferrierite, ZSM-5, mordenite, Y-type zeolite and β-type zeolite. Silica, silica-alumina, zirconia, titania and the like can be used with alumina as the material for the carrier.

It is preferable that the coating layer further contains oxide containing Ce (cerium). The oxide containing Ce has oxygen-occluding and desorbing ability, and accordingly, the oxygen concentration in exhaust gases can be stabilized thereby. This results in that exhaust gases can be kept in the vicinity of its stoichiometric atmosphere, whereby the activity as the three-way catalyst is remarkably improved. Ceria can be used as the oxide containing Ce. It is preferable to use composite oxides which are formed by composing at least one of zirconia and yttria with ceria. By virtue of these composite oxides, the thermal stability of the oxygen-occluding and desorbing ability of ceria is improved, and consequently, the durability thereof is improved. Otherwise, composite oxides which are formed by composing metals such as Nd and Sr with ceria can be used.

The oxide containing Ce can be mixed with alumina in the ratio of 20 to 500 parts by weight to 100 parts by weight of alumina. Where the ratio of the oxide containing Ce is less than the above range, there are not obtained advantages which would be resulted from mixing of the oxide containing Ce with alumina. Where the ratio thereof exceeds the above range, the amount of alumina relatively decreases, whereby the purification performance is degraded.

The noble metals to be carried by the coating layer may be composed of at least one selected from the group consisting of Pt, Rh, Pd, Ir, Ru and the like. In particular, it is preferable to select at least one out of Pt, Rh and Pd. The proper amount of Pt to be carried by the coating layer ranges from 0.5 to 10 g per liter of the substrate. The proper amount of Ph to be carried by the coating layer ranges from 0.1 to 10 g per liter of the substrate. And the proper amount of Pd to be carried by the coating layer ranges from 0.5 to 10 g per liter of the substrate. In order that the substrate carries a plurality of noble metals, the total amount thereof may range from 1 to 10 g per liter of the substrate. Where the amount of noble metals which are carried by the coating layer is less than the above range, the purification rates for HC, CO and $NO_x$ decrease, and where the amount of the noble metals which are carried by the coating layer exceeds the above range, resulting advantages are saturated, and the production costs increase.

The coating layer may be formed, for example, by adhering a mixture powder of alumina powder and zeolite powder to a surface of the substrate along with a ceramics binder or the like, firing the adhered mixture, and making the same carry noble metals. otherwise, after alumina powder is made to carry noble metals previously, the resulting alumina powder carrying the noble metals is mixed with zeolite powder, and a resulting mixture is adhered to the surface of the substrate. The thickness of the coating layer is not limited specifically. The coating layer can be formed arbitrarily provided that the air resistance is not increased thereby.

The HC-adsorbent layer interposed between the substrate and the coating layer can be composed of zeolite such as ferrierite, ZSM-5, mordenite or Y-type zeolite. Furthermore, it is preferable to compose the HC-adsorbent of zeolite which carries noble metals such as Pd or Ag. By carrying these noble metals, zeolite exhibits much improved adsorption properties for HC which has low molecular weights. The HC-adsorbent layer can be formed by adhering powders of HC-adsorbent to a surface of the substrate along with a ceramics binder or the like, and firing the adhered powders. The thickness of the HC-adsorbent layer is not limited specifically. The HC-adsorbent layer can be formed arbitrarily provided that the air resistance is not increased thereby.

When exhaust gases in a low temperature region flow into the catalyst in accordance with the second aspect of the present invention, upon starting engines, for example, noble metals carried by the catalyst do not reach their activity temperatures. Accordingly, HC in exhaust gases arrives at the lowermost HC-adsorbent layer without oxidized, and is adsorbed on the HC-adsorbent, whereby the emission of HC is restrained.

When the temperatures or exhaust gases are elevated to raise the temperatures of the carried noble metals to their activity temperatures or more, HC in exhaust gases is oxidized and purified with the noble metals carried by the upper catalyst layer and lower catalyst layer. In addition, HC adsorbed in the HC-adsorbent layer is desorbed therefrom, and is oxidized and purified with the noble metals carried by the lower catalyst layer and upper catalyst layer while passing these layers. This results in the emission of HC being also restrained when exhaust gases are in a high temperature region.

In accordance with the second aspect of the catalyst of the present invention, Pd is contained in the lower catalyst layer. Pd exhibits high oxidation activity for HC, as compared with Pt and Rh, and accordingly, by adding Pd in the lower catalyst layer which is formed on the HC-adsorbent layer, HC desorbed from the HC-adsorbent can be oxidized and purified efficiently.

Furthermore, at least one of Pt and Rh contained in the upper catalyst layer exhibits excellent oxidation activity for CO and excellent reduction activity for $NO_x$. Accordingly, by virtue of at least one of Pt and Rh which are contained in the upper catalyst layer, CO in exhaust gases is oxidized and purified, and $NO_x$ therein is reduced and purified.

In addition, in accordance with the second aspect of the catalyst for purifying exhaust gases of the present invention, exhaust gases reach the lower catalyst layer after passing the upper catalyst layer. Accordingly, heat of exhaust gases is prevented from being directly conducted to the lower catalyst layer. Accordingly, the probability that Pd contained in the lower catalyst layer is exposed to high temperature atmospheres is low, and consequently, the thermal degradation of Pd is restrained. Since Pd is carried separately from Pt and Rh, Pt or Rh is prevented from being covered with Pd. Therefore, the decrease in the activity of Pt and Rh is prevented. For these reasons, the durability of the present catalyst for purifying exhaust gases is made excellent.

In the second aspect of the catalyst for purifying exhaust gases, the substrate thereof can take a pellet-like configuration, a foam-like configuration or a honeycomb-like configuration. Honeycomb bodies which are prepared by heat-resistant ceramics such as cordierite, winding metallic foil, or the like can be used for the substrate.

The HC-adsorbent can be composed of zeolite such as ferrierite, ZSM-5, mordenite, Y-type zeolite or β-type zeolite. Furthermore, it is also preferable to compose the HC-adsorbent of zeolite which carries noble metals such as Pd or Ag. By carrying these noble metals, zeolite exhibits much improved adsorption properties for HC with a low molecular weight. The HC-adsorbent layer can be formed by adhering HC-adsorbent powder to a surface of a substrate along with a ceramics binder or the like, and firing the adhered powder. The thickness of the HC-adsorbent layer is not limited specifically. The HC-adsorbent layer can be formed arbitrarily provided that the air resistance is not increased thereby.

The lower catalyst layer is composed of a porous oxide carrier which carries Pd, and is formed on a surface of the HC-adsorbent layer. The porous oxide carrier can be composed of a material selected from the group consisting of alumina, silica, silica-alumina, zirconia, titania and the like. It is most preferable to use γ-alumina which exhibits excellent adsorption properties and heat resistance. The proper amount of Pd carried by the lower catalyst layer ranges from 0.5 to 10 g per liter of substrate. When the amount of Pd is less than this range, the HC-purification rate decreases. And when the amount of Pd exceeds this range, the resulting advantage is saturated and the production costs increase.

It is preferable that the lower catalyst layer is composed of at least oxide containing Ce. The oxide containing Ce exhibits oxygen-occluding and desorbing ability, and accordingly, serve to stabilize the oxygen concentration in exhaust gases. This results in that exhaust gases can be stably kept in stoichiometric atmospheres, and consequently, the activity as the three-way catalyst layer is remarkably improved. Ceria can be used as the oxide containing Ce, and it is more preferable to use composite oxides obtained by composing ceria with at least one of zirconia and yttria. By using these composite oxides, the thermal stability of the oxygen-occluding and desorbing ability of ceria is improved, and consequently, the durability is improved. In addition, composite oxides composed of ceria with metals such as Nd and Sr can be used.

The oxide containing Ce can be mixed in the ratio of 20 to 500 parts by weight to 100 parts by weight of the porous oxide carrier. When the amount of the oxide containing Ce is less than this range, the advantages resulted from the mixing of these oxides cannot be obtained. When the amount of the oxide containing Ce exceeds this range, the amount of the porous oxide carrier relatively decreases, and consequently, the purification performance is degraded.

To form the lower catalyst layer, a mixture powder of the porous oxide carrier powder with ceria powder or the like is adhered to a surface of the HC-adsorbent layer along with a ceramics binder or the like, the adhered mixture powder is fired, and Pd is carried thereby, for example. Otherwise, the porous oxide carrier powder is made to carry Pd previously, the resultant porous oxide carrier powder is mixed with ceria powder or the like, and the resultant mixture powder is adhered to the surface of the HC adsorbent layer. The thickness of the lower catalyst layer is not limited specifically. The lower catalyst layer can be formed arbitrarily provided that the air resistance is not increased thereby.

The upper catalyst layer is composed of a porous oxide carrier which carries Pt and Rh, and is formed on a surface of the lower catalyst layer. The porous oxide carrier can be composed of a material selected from the group consisting of alumina, silica, silica-alumina, zirconia, titania and the like, similarly the case of the lower catalyst layer. It is most preferable to use γ-alumina which exhibits excellent adsorption properties and heat resistance. The proper amount of Pt carried by the upper catalyst layer ranges from 0.5 to 10 g per liter of substrate. The proper amount of Rh carried by the upper catalyst layer ranges from 0.1 to 10 g per liter of substrate. When the amounts of Pt and Rh are respectively less than these ranges, the purification rates of CO and $NO_x$ respectively decrease. And when the amounts of Pt and Rh respectively exceed these ranges, resulting advantages are saturated and the production costs increase.

The noble metals carried by the upper catalyst layer are Pt and Rh. If only Pt is carried, the purification performance for $NO_x$ is inferior. And if only Rh is carried, the purification activity for CO is inferior. For these reasons, by carrying both Pt and Rh, the purification activity is remarkably improved due to the interaction thereof.

It is preferable that the upper catalyst layer contains at least oxide containing Ce. The oxide containing Ce serves to stabilize the oxygen concentration in exhaust gazes. This results in that exhaust gases can be stably kept in stoichiometric atmospheres, and consequently, the activity as the three-way catalyst layer is remarkably improved. Ceria can be used as the oxide containing Ce, similarly to the case of the lower catalyst layer, and it is more preferable to use composite oxides obtained by composing ceria with at least one of zirconia and yttria. By using these composite oxides, the thermal stability of the oxygen-occluding and desorbing ability of ceria is improved, and consequently, the durability is improved. In addition, composite oxides of ceria with metals such as Nd and Sr can be used.

The oxide containing Ce can be mixed into the porous oxide carrier in the ratio of 20 to 500 parts by weight to 100 parts by weight of the porous oxide carrier, similarly to the case of the lower catalyst layer. When the amount of the oxide containing Ce is less than this range, the advantages resulted from mixing of these oxides cannot be obtained. When the amount of the oxide containing Ce exceeds this range, the amount of the porous oxide carrier relatively decreases, and consequently the purification performance is degraded.

To form the upper catalyst layer, a mixture powder of the porous oxide carrier powder with ceria powder or the like is attached to a surface of the lower catalyst layer along with a ceramics binder or the like, the attached mixture powder is fired, and Pt and Rh are carried thereby, for example. Otherwise, the porous oxide carrier powder is made to carry Pt and Rh previously, the resultant porous oxide carrier powder is mixed with ceria powder or the like, and the resultant mixture powder is attached to the surface of the lower catalyst layer. The thickness of the upper catalyst layer is not limited specifically. The upper catalyst layer can be formed arbitrarily provided that the air resistance is not increased thereby.

In accordance with the second aspect of the catalyst for purifying exhaust gases of the present invention, it is preferable to adjust the ratio of the lower catalyst layer and the upper catalyst layer relative to the HC-adsorbent layer such that the amount of the HC-adsorbent ranges from 50 to 300 parts by weight to 100 parts by weight of the total amount of the porous oxide carriers in the lower catalyst layer and the upper catalyst layer. If the amount of the HC-adsorbent is less than this range, the HC-purification rate decreases when exhaust gases are in a low temperature region upon starting engines, for example, and if the amount of the HC-adsorbent exceeds this range, HC desorbed from the HC-adsorbent is not sufficiently purified, and consequently, the HC-purification rate decreases.

The catalyst for purifying exhaust gases in accordance with the present invention can be used as a three-way catalyst by adjusting the air-fuel ratio into about its stoichiometric ratio. In addition, the catalyst in accordance with the present invention can be also used as an oxidation catalyst without adjusting the air-fuel ratio in such a way. Furthermore, the catalyst in accordance with the present invention can be preferably disposed upstream of an $NO_x$-occluding and reducing type catalyst, thus constructing a tandem purifying device. With this arrangement, exhaust gases of which temperatures are further elevated due to the reaction heat of the oxidation reaction of HC in the catalyst of the present invention flow into the $NO_x$-occluding and reducing type catalyst which is provided downstream of the catalyst of the present invention. Consequently, the $NO_x$-purification ability of the $NO_x$-occluding and reducing type catalyst is further improved.

Hereinafter, the present invention will be explained based on several embodiments and comparative examples.

Embodiment 1:

FIG. 1 is an enlarged sectional view of a main part of one embodiment of a catalyst for purifying exhaust gases in accordance with the present invention. The catalyst for purifying exhaust gases includes a honeycomb substrate 1 composed of cordierite, and a coating layer 2 formed on walls defining honeycomb-like passages of the honeycomb substrate 1. The coating layer 2 is composed of alumina powder and zeolite powder, and Pd is carried by the alumina powder.

Hereinafter, the method for producing this catalyst for purifying exhaust gases will be explained. 100 g of alumina powder, an aqueous solution of palladium nitrate (Pd: 5 g) and 100 g of water were mixed together, a resultant mixture was dried and made solid by evaporation, and a dried solid mixture was fired at 500° C. for 1 hour and pulverized. Thus, Pd—$Al_2O_3$ powder wherein Pd is carried by alumina powder was prepared. Then, 105 g of Pd—$Al_2O_3$ powder, 20 g of β-type zeolite powder, 2 g of alumina sol (solid part) as a binder, and 150 g of water were mixed by means of a ball mill to prepare a slurry.

On the other hand, a honeycomb substrate 1 composed of cordierite, of which the volume was 1000 ml, was prepared, and immersed in the above slurry. After the honeycomb substrate 1 was taken from the slurry, excess slurry was removed from the honeycomb substrate 1. Then, the honeycomb substrate 1 was dried at 250° C. for 2 hours, and fired at 500° C. for 2 hours to form the coating layer 2. Thus, the catalyst of Embodiment 1 was obtained. The honeycomb substrate 1 has 127 g of coating layer 2. The amount of Pd carried by the coating layer 2 is 5 g against the honeycomb substrate 1.

Embodiment 2:

A catalyst of Embodiment 2 was prepared using a slurry similar to that used in Embodiment 1, by the method similar to that of Embodiment 1 except that the amount of β-type zeolite powder was changed to 100 g.

Figure 2:
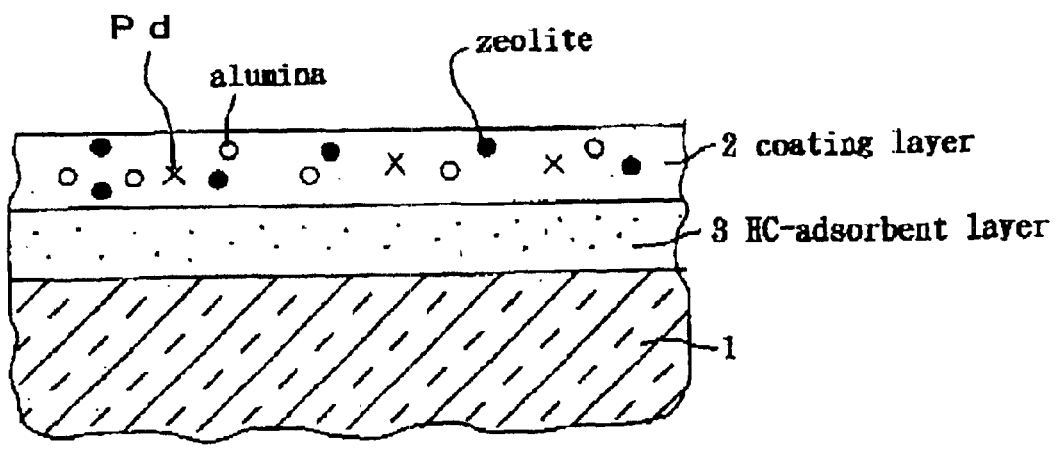
FIG. 2 is an enlarged sectional view which schematically illustrates the arrangement of a main part of a third embodiment of a catalyst for purifying exhaust gases in accordance with the present invention.

Embodiment 3:

FIG. 2 is an enlarged sectional view of a main part of Embodiment 3 of a catalyst in accordance with the present invention. This catalyst includes a honeycomb substrate 1 composed of cordierite, an HC-adsorbent layer 3 formed on walls of the honeycomb substrate 1, and a coating layer 2 formed on a surface of the HC-adsorbent layer 3. The coating layer 2 is composed of alumina powder and zeolite powder, and Pd is carried by the alumina powder.

Hereinafter, the method for producing the catalyst for purifying exhaust gases of Embodiment 3 will be explained. 20 g of β-type zeolite powder, 1 g of silica sol (solid part) as a binder, and 150 g of water were mixed by means of a ball mill to prepare a slurry. Next, a cordierite honeycomb substrate 1 of which the volume was 1000 ml was prepared, and immersed in the above-described slurry. After the honeycomb substrate 1 was taken from the slurry, excess slurry was removed from the honeycomb substrate 1. Then, the honeycomb substrate 1 was dried at 250° C. for 2 hours, and fired at 500° C. for 2 hours to form the HC-adsorbent layer 3. The honeycomb substrate 1 had 21 g of HC-adsorbent layer 3.

100 g of alumina powder, an aqueous solution of palladium nitrate (Pd: 5 g) and 100 g of water were mixed together, a resultant mixture was dried and made solid by evaporation, and a dried solid mixture was fired at 500° C. for 1 hour and pulverized. Thus, Pd—$Al_2O_3$ powder wherein Pd is carried by alumina powder was prepared. Then, 105 g of Pd—$Al_2O_3$ powder, 20 g of β-type zeolite powder, 2 g of alumina sol (solid part) as a binder, and 1 50 g of water were mixed by means of a ball mill to prepare a slurry.

And the honeycomb substrate 1 having the HC-adsorbent layer 3 was immersed in the above slurry. After the honeycomb substrate 1 was taken from the slurry, excess slurry was removed from the honeycomb substrate 1. Then, the honeycomb substrate 1 was dried at 250° C. for 2 hours, and fired at 500° C. for 2 hours to form the coating layer 2. The honeycomb substrate 1 has 107 g of coating layer 2. The amount of Pd carried by the coating layer 2 is 5 g against the honeycomb substrate 1.

Embodiment 4:

Pt—$Al_2O_3$ powder was prepared by the method similar to that of Embodiment 1 except that not an aqueous solution of palladium nitrate but an aqueous solution of platinum nitrate was used, and a slurry was prepared by the method similar to that of Embodiment 1 except that Pd—$Al_2O_3$ powder was replaced with Pt—$Al_2O_3$ powder. A coating layer 2 was formed using the prepared slurry, similarly to Embodiment 1. The amount of Pt carried by the coating layer 2 is identical to the amount of Pd in Embodiment 1.

Embodiment 5:

Rh—$Al_2O_3$ powder was prepared by the method similar to that of Embodiment 1 except that not an aqueous solution of palladium nitrate but an aqueous solution of rhodium nitrate was used, and a slurry was prepared by the method similar to that of Embodiment 1 except that Pd—$Al_2O_3$ powder was replaced with Rh—$Al_2O_3$ powder. A coating layer 2 was formed using the prepared slurry, similarly to Embodiment 1. The amount of Rh carried by the coating layer 2 is identical to the amount of Pd in Embodiment 1.

Embodiment 6:

Pt—Pd—$Al_2O_3$ powder was prepared by the method similar to that of Embodiment 1 except that not an aqueous solution of palladium nitrate but a mixture aqueous solution of an aqueous solution of palladium nitrate and an aqueous solution of platinum nitrate was used. A slurry was prepared by the method similar to that of Embodiment 1 except that Pd—$Al_2O_3$ powder was replaced with Pt—Pd—$Al_2O_3$ powder. A coating layer 2 was formed using the prepared slurry, similarly to Embodiment 1. The total amount of Pt and Pd carried by the coating layer 2 is identical to the amount of Pd in Embodiment 1.

Embodiment 7:

Rh—Pd—$Al_2O_3$ powder was prepared by the method similar to that of Embodiment 1 except that not an aqueous solution of palladium nitrate but a mixture aqueous solution of an aqueous solution of palladium nitrate and an aqueous solution of rhodium nitrate was used, and a slurry was prepared by the method similar to that of Embodiment 1 except that Pd—$Al_2O_3$ powder was replaced with Rh—Pd—$Al_2O_3$ powder. A coating layer 2 was formed using the prepared slurry, similarly to Embodiment 1. The total amount of Rh and Pd carried by the coating layer 2 is identical to the amount of Pd in Embodiment 1.

Embodiments 8:

Pt—Rh—$Al_2O_3$ powder was prepared by the method similar to that of Embodiment 1 except that not an aqueous solution of palladium nitrate but a mixture aqueous solution of an aqueous solution of platinum nitrate and an aqueous solution of rhodium nitrate was used, and a slurry was prepared by the method similar to that of Embodiment 1 except that Pd—$Al_2O_3$ powder was replaced with Pt—Rh—$Al_2O_3$ powder. A coating layer 2 was formed using the prepared slurry, similarly to Embodiment 1. The total amount of Pt and Rh carried by the coating layer 2 is identical to the amount of Pd in Embodiment 1.

Embodiment 9:

Pt—Rh—Pd—$Al_2O_3$ powder was prepared by the method similar to that of Embodiment 1 except that not an aqueous solution of palladium nitrate but a mixture aqueous solution of an aqueous solution of platinum nitrate, an aqueous solution of rhodium nitrate and an aqueous solution of palladium nitrate was used. A slurry was prepared by the method similar to that of Embodiment 1 except that Pd—$Al_2O_3$ powder was replaced with Pt—Rh—Pd—$Al_2O_3$ powder. A coating layer 2 was formed using the prepared slurry, similarly to Embodiment 1. The total amount of Pt, Rh and Pd carried by the coating layer 2 is identical to the amount of Pd in Embodiment 1.

COMPARATIVE EXAMPLE 1

A catalyst of Comparative example 1 was prepared similarly to Embodiment 1, using a slurry which was similar to that of Embodiment 1 except that the amount of β-type zeolite powder was changed to 150 g.

COMPARATIVE EXAMPLE 2

A catalyst of Comparative example 2 was prepared similarly to Embodiment 1, using a slurry which was similar to that of embodiment 1 except that β-type zeolite powder was not used.

TEST EVALUATION

Catalysts of embodiments and comparative examples were respectively mounted on vehicles having engines of 2.2 L, in position 30 cm downstream from such engines, and the HC-purification rate of each catalyst was measured when the vehicles are driven in US LA#4 mode with the air-fuel ratio (A/F) adjusted to 14.6±0.1. The measurement results are shown in TABLE 1.

TABLE 1

|  | Composition of first layer (weight ratio) & noble metal carried thereby | Composition of second layer (weight ratio) & noble metal carried thereby | Purification rate for HC (%) |
|---|---|---|---|
| Embodiment 1 | $Al_2O_3$:β-type zeolite = 5:1<br>Pd | — | 88.2 |
| Embodiment 2 | $Al_2O_3$:β-type zeolite = 1:1<br>Pd | — | 97.9 |
| Embodiment 3 | β-type zeolite | $Al_2O_3$:β-type zeolite = 5:1<br>Pd | 98.5 |
| Embodiment 4 | $Al_2O_3$:β-type zeolite = 5:1<br>Pt | — | 98.0 |
| Embodiment 5 | $Al_2O_3$:β-type zeolite = 5:1<br>Rh | — | 98.2 |
| Embodiment 6 | $Al_2O_3$:β-type zeolite = 5:1<br>Pt, Pd | — | 97.8 |
| Embodiment 7 | $Al_2O_3$:β-type zeolite = 5:1<br>Rh, Pd | — | 98.3 |
| Embodiment 8 | $Al_2O_3$:β-type zeolite = 5:1<br>Pt, Rh | — | 98.1 |
| Embodiment 9 | $Al_2O_3$:β-type zeolite = 5:1<br>Pt, Rh, Pd | — | 98.3 |
| Comparative example 1 | $Al_2O_3$:β-type zeolite = 2:3<br>Pd | — | 94.3 |
| Comparative example 2 | $Al_2O_3$<br>Pd | — | 94.9 |

As is apparent from TABLE 1, the catalysts of Embodiment 1 and Embodiment 2 exhibit higher HC-purification rates, as compared with the catalyst of Comparative example 2. Namely, these measurement results show that the HC-purification performance is remarkably improved by composing the coating layer with a mixture of alumina and zeolite.

Upon comparing Embodiment 1, Embodiment 2 and Comparative example 1 with each other, it has become clear that when the amount of zeolite exceeds the amount of alumina, the HC-purification rate decreases. These comparison results show that the preferred weight ratio of alumina and zeolite ranges from 5:1 to 1:1.

In addition, upon comparing Embodiment 3 and Embodiment 1 with each other, it has become clear that the HC-purification rate is further improved by forming the HC-adsorbent layer between the substrate and the coating layer.

And upon comparing embodiments with each other, it has become clear that approximately identical operational advantages can be effected in both cases only one kind of noble metal is used and plural kinds of noble metals are used.

Figure 3:
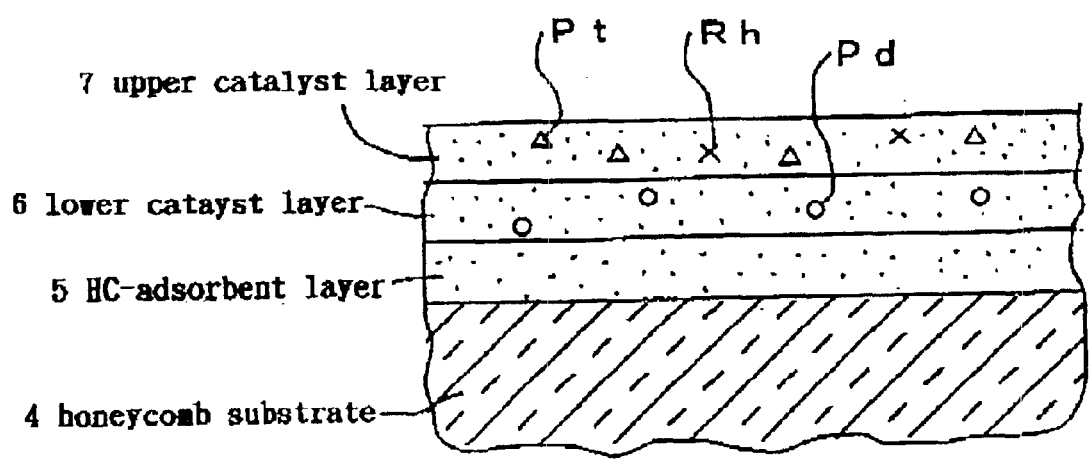
FIG. 3 is an enlarged sectional view which schematically illustrates the arrangement of a main part of a tenth embodiment of a catalyst for purifying exhaust gases in accordance with the present invention.

Embodiment 10:

FIG. 3 is an enlarged sectional view of a main part of one embodiment of the catalyst for purifying exhaust gases in accordance with the present invention. This catalyst includes a honeycomb substrate 4 composed of cordierite, an HC-adsorbent layer 5 formed on a wall surface defining honeycomb passages of the honeycomb substrate 4, a lower catalyst layer 6 formed on a surface of the HC-adsorbent layer 5, and an upper catalyst layer 7 formed on a surface of the lower catalyst layer 6.

The lower catalyst layer 6 is composed of alumina and a composite oxide of ceria and zirconia as a carrier. Pd is carried by alumina. The upper catalyst layer is composed of alumina and a composite oxide of ceria and zirconia as a carrier. Pt and Rh are carried by alumina.

Hereinafter, the method for producing the present catalyst for purifying exhaust gases will be explained.

100 g of β-type zeolite powder, 5 g of silica sol (solid part) as a binder, and 150 g of water were mixed by means of a ball mill to prepare a slurry. Then, the honeycomb substrate 4 composed of cordierite, of which the volume was 1000 ml, was prepared, and immersed in the above slurry. After the honeycomb substrate 4 was taken from the slurry, excess slurry was removed from the honeycomb substrate 4. Then, the honeycomb substrate 4 was dried at 250° C. for 2 hours, and fired at 500° C. for 2 hours to form the HC-adsorbent layer 5. 105 g of the HC-adsorbent layer 5 was formed on the honeycomb substrate 4.

Next, 100 g of alumina powder, an aqueous solution of palladium nitrate (Pd: 5 g) and 100 g of water were mixed together, a resultant mixture was dried and made solid by evaporation, and a dried solid mixture was fired at 500° C. for 1 hour and pulverized. Thus, Pd—$Al_2O_3$ powder wherein Pd is carried by alumina powder was prepared. Then, 105 g of this Pd—$Al_2O_3$ powder, 50 g of $CeO_2$—$ZrO_2$ powder as a composite oxide, and 2 g of alumina sol (solid part) as a binder, and 100 g of water were mixed by means of a ball mill to prepare a slurry. Then, the honeycomb substrate 4 provided with the HC-adsorbent layer 5 was immersed in this slurry. After the honeycomb substrate 4 was taken from the slurry, excess slurry was removed from the honeycomb substrate 4. Then, the honeycomb substrate 4 was dried at 250° C. for 2 hours, and fired at 500° C. for 2 hours to form the lower catalyst layer 6.157 g of the lower catalyst layer 6 was formed on the honeycomb substrate 4.

The amount of Pd carried by the lower catalyst layer 6 is 5 g against the honeycomb substrate 4.

Then, 100 g of alumina powder, an aqueous solution of platinum nitrate (Pt: 5 g), an aqueous solution of rhodium nitrate (Rh: 1 g) and 100 g of water were mixed together, a resultant mixture was dried and made solid by evaporation, and a dried solid mixture was fired at 500° C. for 1 hour and pulverized. Thus, Pt—Rh—$Al_2O_3$ powder wherein Pt and Rh are carried by alumina powder was prepared. Then, 106 g of this Pt—Rh—$Al_2O_3$ powder, 50 g of $CeO_2$—$ZrO_2$ powder as a composite oxide, and 2 g of alumina sol (solid part) as a binder, and 100 g of water were mixed by means of a ball mill to prepare a slurry. Then, the honeycomb substrate 4 provided with the HC-adsorbent layer 5 and the lower catalyst layer 6 was immersed in this slurry. After the honeycomb substrate 4 was taken from the slurry, excess slurry was removed from the honeycomb substrate 4. Then, the honeycomb substrate 4 was dried at 250° C. for 2 hours, and fired at 500° C. for 2 hours to form the upper catalyst layer 7. 158 g of the upper catalyst layer 7 was formed on the honeycomb substrate 4. The amount of Pt carried by the upper catalyst layer 7 is 5 g and the amount of Rh carried by the upper catalyst layer 7 is 1 g against the honeycomb substrate 4.

COMPARATIVE EXAMPLE 3

The catalyst for purifying exhaust gases of Comparative example 3 has the arrangement identical to that of Embodiment 10 except that no lower catalyst layer 6 is provided, and Pd, Pt and Rh are carried by the upper catalyst layer 7.

200 g of alumina powder, an aqueous solution of palladium nitrate (Pd: 5 g), an aqueous solution of platinum nitrate (Pt: 5 g) and an aqueous solution of rhodium nitrate (Rh: 1 g), and 200 g of water were mixed together, a resultant mixture was dried and made solid by evaporation, and a dried solid mixture was fired at 500° C. for 1 hour and pulverized. Thus, Pd—Pt—Rh—$Al_2O_3$ powder wherein Pd, Pt and Rh were carried by alumina powder was prepared. Then, 211 g of Pd—Pt—Rh—$Al_2O_3$ powder, 100 g of $CeO_2$—$ZrO_2$ powder as a composite oxide, 4 g of alumina sol (solid part) as a binder, and 400 g of water were mixed by means of a ball mill to prepare a slurry.

Then, the honeycomb substrate 4 provided with the HC-adsorbent layer 5, which was formed similarly to the method in Embodiment 10, was immersed in this slurry. After the honeycomb substrate 4 was taken from the slurry, excess slurry was removed from the honeycomb substrate 4. Then, the honeycomb substrate 4 was dried at 250° C. for 2 hours, and fired at 500° C. for 2 hours to from the upper catalyst layer 7. 315 g of the upper catalyst layer 7 was formed on the honeycomb substrate 4. The amount of Pd carried by the upper catalyst layer 7 is 5 g against the honeycomb substrate 4, the amount of Pt carried by the upper catalyst layer 7 is 5 g against the honeycomb substrate 4, and the amount of Rh carried by the upper catalyst layer 7 is 1 g against the honeycomb substrate 4.

COMPARATIVE EXAMPLE 4

The catalyst for purifying exhaust gases of Comparative example 4 was prepared by the method similar to that of Embodiment 10 except that no HC-adsorbent layer 5 was formed.

COMPARATIVE EXAMPLE 5

The catalyst for purifying exhaust gases of Comparative example 5 was prepared by the method similar to that of Embodiment 10 except that no lower catalyst layer 6 was formed.

COMPARATIVE EXAMPLE 6

The catalyst for purifying exhaust gases of Comparative example 6 was prepared by the method similar to that of Embodiment 10 except that no upper catalyst layer 7 was formed.

COMPARATIVE EXAMPLE 7

First, the HC-adsorbent layer 5 was formed on a surface of the honeycomb substrate 4 Then, the upper catalyst layer 7 was formed on a surface of the HC-adsorbent layer 5, and the lower catalyst layer 6 was formed on a surface of the upper catalyst layer 7. The methods for forming these layers and the forming amounts thereof are similar to those in Embodiment 10.

COMPARATIVE EXAMPLE 8

First, the lower catalyst layer 6 was formed on a surface of the honeycomb substrate 4. Then, the HC-adsorbent layer 5 was formed on a surface of the lower catalyst layer 6, and the upper catalyst layer 7 was formed on a surface of the HC-adsorbent layer 5. The methods for forming these layers and the forming amounts thereof are similar to those in Embodiment 10.

COMPARATIVE EXAMPLE 9

First, the lower catalyst layer 8 was formed on a surface of the honeycomb substrate 4. Then, the upper catalyst layer 7 was formed on a surface of the lower catalyst layer 6, and the HC-adsorbent layer 5 was formed on a surface of the upper catalyst layer 7. The methods for forming these layers and the forming amounts thereof are similar to those in Embodiment 10.

COMPARATIVE EXAMPLE 10

First, the upper catalyst layer 7 was formed on a surface of the honeycomb substrate 4. Then, the HC-adsorbent layer 5 was formed on a surface of the upper catalyst layer 7, and the lower catalyst layer 6 was formed on a surface of the HC-adsorbent layer 5. The methods for forming these layers and the forming amounts thereof are similar to those in Embodiment 10.

COMPARATIVE EXAMPLE 11

First, the upper catalyst layer 7 was formed on a surface of the honeycomb substrate 4. Then, the lower catalyst layer 6 was formed on a surf ace of the upper catalyst layer 7, and the HC-adsorbent layer 5 was formed on a surface of the lower catalyst layer 6. The methods for forming these layers and the forming amounts thereof are similar to those in Embodiment 10.

COMPARATIVE EXAMPLE 12

The catalyst for purifying exhaust gases of Comparative example 12 was prepared by the method similar to that of Embodiment 10 except that no aqueous solution of rhodium nitrate was added to the slurry composing the upper catalyst layer 7.

COMPARATIVE EXAMPLE 13

The catalyst for purifying exhaust gases of Comparative example 13 was prepared by the method similar to that of Embodiment 10 except that no aqueous solution of platinum nitrate was added to a slurry composing the upper catalyst layer 7.

Test. Evaluation

Catalysts of the embodiments and comparative examples were respectively mounted on vehicles having engines of 2.2 L, in positions 30 cm downstream from such engines, and the purification rates of HC, CO and $NO_x$ of each catalysts were respectively measured when vehicles were driven in US LA#4 mode with the air fuel ratio (A/F) adjusted to 14.6±0.1. The measurement results are shown in TABLE 2.

TABLE 2

| | First layer | Second layer | Third layer | Purification rate (%) | | |
|---|---|---|---|---|---|---|
| | | | | NMHC | CO | $NO_x$ |
| Embodiment 10 | β-type zeolite | $Al_2O_3 + CeO_2$ —$ZrO_2$ Pd | $Al_2O_3 + CeO_2$ —$ZrO_2$ Pt, Rh | 99.1 | 94.5 | 99.2 |
| Comparative example 3 | β-type zeolite | — | $Al_2O_3 + CeO_2$ —$ZrO_2$ Pt, Rh, Pd | 98.0 | 90.5 | 97.1 |
| Comparative example 4 | — | $Al_2O_3 + CeO_2$ —$ZrO_2$ Pd | $Al_2O_3 + CeO_2$ —$ZrO_2$ Pt, Rh | 93.7 | 94.7 | 99.0 |
| Comparative example 5 | β-type zeolite | — | $Al_2O_3 + CeO_2$ —$ZrO_2$ Pt, Rh | 90.0 | 92.3 | 96.7 |
| Comparative example 6 | β-type zeolite | $Al_2O_3 + CeO_2$ —$ZrO_2$ Pd | — | 97.6 | 89.2 | 92.4 |
| Comparative example 7 | β-type zeolite | $Al_2O_3 + CeO_2$ —$ZrO_2$ Pt, Rh | $Al_2O_3 + CeO_2$ —$ZrO_2$ Pd | 94.8 | 94.3 | 98.9 |
| Comparative example 8 | $Al_2O_3 + CeO_2$ —$ZrO_2$ Pd | β-type zeolite | $Al_2O_3 + CeO_2$ —$ZrO_2$ Pt, Rh | 89.6 | 94.3 | 98.7 |
| Comparative example 9 | $Al_2O_3 + CeO_2$ —$ZrO_2$ Pd | $Al_2O_3 + CeO_2$ —$ZrO_2$ Pt, Rh | β-type zeolite | 89.7 | 94.0 | 98.5 |
| Comparative example 10 | $Al_2O_3 + CeO_2$ —$ZrO_2$ Pt, Rh | β-type zeolite | $Al_2O_3 + CeO_2$ —$ZrO_2$ Pd | 94.5 | 93.8 | 98.3 |
| Comparative example 11 | $Al_2O_3 + CeO_2$ —$ZrO_2$ Pt, Rh | $Al_2O_3 + CeO_2$ —$ZrO_2$ Pd | β-type zeolite | 92.9 | 94.1 | 98.6 |
| Comparative example 12 | β-type zeolite | $Al_2O_3 + CeO_2$ —$ZrO_2$ Pd | $Al_2O_3 + CeO_2$ —$ZrO_2$ Pt | 98.0 | 94.7 | 93.0 |
| Comparative example 13 | β-type zeolite | $Al_2O_3 + CeO_2$ —$ZrO_2$ Pd | $Al_2O_3 + CeO_2$ —$ZrO_2$ Rh | 95.1 | 90.3 | 98.3 |

TABLE 2 shows that although, in Comparative example 3, noble metals of which the amount is identical to that of Embodiment 10 are carried thereby, the purification performance is inferior to that of Embodiment 10. This result is considered to be caused by the decrease in the activity of Pt and Rh due to the occurrence of covering of Pt and Rh with Pd.

In Comparative example 4, since no HC-adsorbent layer 5 is provided therein, the HC-purification rate remarkable decreases, as compared with that of Embodiment 10.

In Comparative example 5, since no lower catalyst layer 6 is provided therein, the purification with Pd is not carried out to decrease the purification rates for HC, CO and $NO_x$. In particular, the purification rate for HC is remarkably low.

In Comparative example 6, since no upper catalyst layer 7 is provided therein, the purification with Pt and Rh is not carried out to decrease the purification rates for HC, CO and $NO_x$.

In Comparative example 7, it is considered that since the lower catalyst layer 6 exists as an uppermost layer, thermal degradation occurs in Pd to decrease the purification rate for HC.

In Comparative example 8, the lower catalyst layer 6 exists under the HC-adsorbent layer 5. Therefore, it is considered that the probability that HC desorbed from the HC-adsorbent contacts Pd becomes low to decrease the purification rate for HC.

In Comparative example 9, the HC-adsorbent layer 5 exists as an uppermost layer. Therefore, it is considered that almost all HC desorbed from the HC-adsorbent is emitted to decrease the purification rate for HC.

In Comparative example 10, the lower catalyst layer 6 exists above the HC-adsorbent layer 5, and the upper catalyst layer 7 exists below the HC-adsorbent layer 5. Therefore, the probability that HC desorbed from the HC-adsorbent contacts Pd is equal to that in Embodiment 10. Consequently, the purification rate for HC is high, as compared with Comparative example 8. However, the upper catalyst layer 7 exists as a lowermost layer so that the purification rates for CO and $NO_x$ are low, and the purification rate for HC is inferior to that in Embodiment 10.

In Comparative example 11, the HC-adsorbent layer 5 exists as an uppermost layer, similarly to Comparative example 9. Therefore, it is considered that since almost all HC desorbed from the HC-adsorbent is emitted, the purification rate for HC decreases. The purification rate for HC is high, as compared with that in Comparative example 9. This is considered to be caused by Pd being included in the lower catalyst layer 6 which is located under the HC-adsorbent layer 5.

In Comparative example 12, since the upper catalyst layer 7 carries only Pt, the purification rate for $NO_x$ is low, and in comparative example 13, since the upper catalyst layer 7 carries only Rh, the purification rate for $NO_x$ is low.

From these test results, it is clear that in the catalyst for purifying exhaust gases of Embodiment 10, the purification rates for HC, CO and $NO_x$ are the highest, as compared with those of comparative examples, and that the purification performance thereof is extremely excellent. It is apparent that the above-described operational advantage is resulted from the arrangement of the third aspect of the present invention.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A catalyst for purifying exhaust gases, comprising:
a substrate having heat resistance;
a coating layer which is composed of a carrier containing alumina as a main component, and zeolite, and formed on a surface of said substrate;
a noble metal which is carried by said coating layer, the weight ratio of alumina and zeolite in said coating layer ranging from 5:1 to 1:1; and
an HC-adsorbent layer interposed between said substrate and said coating layer, wherein the HC-adsorbent layer includes no noble metal.

2. A catalyst as claimed in claim 1, wherein said noble metal is at least one selected from the group consisting of Pt, Rh and Pd.

3. A catalyst as claimed in claim 1, wherein said HC-adsorbent is zeolite.

4. A catalyst as claimed in claim 3, wherein said zeolite is β-type zeolite.

5. A catalyst for purifying exhaust gases, comprising:
a substrate having heat resistance;
an HC-adsorbent layer comprising zeolite formed on a surface of said substrate, wherein said zeolite consists of β-type zeolite;
a lower catalyst layer which is composed of a porous carrier carrying only Pd and excluding Pt and Rh, and is formed on a surface of said HC-adsorbent layer; and
an upper catalyst layer which is composed of a porous carrier carrying Pt and Rh, and is formed on a surface of said lower catalyst layer;
wherein Pt and Rh are carried on the same porous carrier.

6. A catalyst as claimed in claim 5, wherein at least one of said lower catalyst layer and said upper catalyst layer contains at least oxide containing Ce.

7. A catalyst as claimed in claim 5, wherein the HC-adsorbent layer consists of β-type zeolite.

* * * * *